US006497049B1

United States Patent
Holzapfel et al.

(10) Patent No.: US 6,497,049 B1
(45) Date of Patent: Dec. 24, 2002

(54) OPTICAL POSITION-MEASURING DEVICE

(75) Inventors: Wolfgang Holzapfel, Obing (DE); Heinz Tovar, Traunstein (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 33 days.

(21) Appl. No.: 09/663,214

(22) Filed: Sep. 15, 2000

(30) Foreign Application Priority Data

Sep. 17, 1999 (DE) ................................ 299 16 394 U

(51) Int. Cl.[7] .............................................. G01B 11/02
(52) U.S. Cl. ........................................ 33/707; 356/616
(58) Field of Search ........................ 33/707, 706, 710; 356/616

(56) References Cited

U.S. PATENT DOCUMENTS

| | | | | |
|---|---|---|---|---|
| 2,948,890 A | * | 8/1960 | Barth et al. .................. | 33/710 |
| 3,106,127 A | * | 10/1963 | Koller ......................... | 33/710 |
| 3,223,845 A | * | 12/1965 | Wales .......................... | 33/710 |
| 3,280,693 A | * | 10/1966 | Rantsch ....................... | 356/616 |
| 3,552,861 A | * | 1/1971 | Albarda ....................... | 356/616 |
| 4,461,083 A | * | 7/1984 | Ernst .......................... | 33/707 |
| 5,260,769 A | * | 11/1993 | Ieki et al. ..................... | 33/707 |
| 5,404,226 A | * | 4/1995 | Kellner ........................ | 33/707 |
| 5,640,008 A | * | 6/1997 | Bosch et al. ................. | 356/616 |
| 5,678,319 A | * | 10/1997 | Huber .......................... | 33/707 |
| 6,240,652 B1 | * | 6/2001 | Bobel et al. .................. | 33/707 |

FOREIGN PATENT DOCUMENTS

| DE | 26 15 676 | 10/1976 |
|---|---|---|
| DE | 36 09 211 | 9/1987 |

* cited by examiner

Primary Examiner—Christopher W. Fulton
(74) Attorney, Agent, or Firm—Kenyon & Kenyon

(57) ABSTRACT

An optical position-measuring device is described, that includes a scale and a scanning unit movable relative thereto, a light source, one or more scanning graduations, at least one opto-electronic detector element and a mirror lens arranged downstream of the light source. The mirror lens includes a plane reflector surface and two partial surface areas having different radii of curvature. The beams entering through a first partial surface area impinge on the reflector surface and are reflected from the reflector surface in the direction of the second partial surface area. A collimated beam exists subsequent to exiting the second partial surface area.

10 Claims, 3 Drawing Sheets

OPTICAL POSITION-MEASURING DEVICE

DESCRIPTION OF RELATED ART

Conventional optical position-measuring devices usually include a measuring graduation as well as a scanning unit, which is movable relative thereto in the measuring direction. On the side of the scanning unit, there is generally a light source, collimator optics, one or a plurality of scanning graduations as well as one or a plurality of opto-electronic detector elements. The position-measuring devices, in particular the scanning unit, are often required to be as compact as possible. These requirements can be fulfilled by guiding the scanning beam in an appropriate manner. In particular, folded scanning beam paths are advantageous, which, in addition to the components described above, further include one or a plurality of deflector or reflector elements disposed on the side of the scanning unit.

German Patent 26 15 676 describes an optical position-measuring device having a folded scanning beam path. The collimator optics and a deflector element are integrated in a single optical component. The component having the optical double function in the scanning beam path can be a mirror lens. However, details of the mirror lens, in particular with respect to its manufacture, are not described in this patent. According to this patent, the proposed mirror lens provides deflection and collimation of the beams of light, but has a relatively large unit volume. Also, due to the proposed optical path in the mirror lens, light cannot be prevented from reaching the collimator optics directly from the light source, without any previous deflection of these beams of rays. Consequently, a desired pupil separation is not guaranteed when using this component for folding the scanning beam path.

A similar mirror lens in the folded scanning beam path of an optical position-measuring device is also known from German Patent 36 09 211 A1. A disadvantage of this design of a mirror lens is// that two reflector surfaces are required to produce the desired deflection. However, highly exact reflector surfaces require a considerable effort during manufacture, similar to the manufacture of two spatially separated, curved lens surfaces via which the scanning beam enters and exits.

SUMMARY OF THE INVENTION

The present invention is an optical position-measuring device which includes a scanning unit having a compact design. The optical components in the scanning beam path ensure a good signal quality of the resulting scanning signals, and also can be manufactured in a simple manner.

In one embodiment, the invention is an optical position-measuring device having a scale and a scanning unit movable relative thereto, comprising a light source, a plurality of scanning graduations, at least one opto-electronic detector element, a mirror lens disposed downstream of the light source, and a single plane reflector surface formed on the mirror lens. The invention also includes a first and a second partial surface portion of the mirror lens, the first partial surface portion having a different curvature than the second partial surface, disposed opposite of the single plane reflector surface such that beams of light entering the mirror lens through the first partial surface portion impinge on the reflector surface and are reflected towards the second partial surface portion. The curvatures of the first and second partial surface portions are selected such that a collimated beam of light exits the second partial surface area, and that optical axes of the first and second partial surface portions intersect one another in a plane of the reflector surface.

According to an embodiment of the present invention, the scanning unit includes a mirror lens which, in addition to the optical collimation effect, allows the scanning beam path to be deflected or folded. The exemplary mirror lens has only a single plane reflector surface, opposite of which two partial surface areas having differently curved surfaces are arranged. In each case, one optically active partial surface area is allocated to the incident beams, and the other to the emergent beams. The different partial surface areas are preferably designed as optically active or imaging asphere, which results in a larger usable image field angle.

Due to the folding of the scanning beam path according to the present invention, the desired compact design of the optical position-measuring device is obtained. The mirror lens required for this design is easy to manufacture, which results from the approximated piano-convex shape of the mirror lens which ensures a simple moldability of the two partial areas having different optical properties. The mirror lens can be manufactured both from glass or from plastic. The mirror lens is preferably manufactured by one-sided glass pressing, i.e., the convex side of the mirror lens having the two differently curved partial areas is pressed, whereas the plane side having the reflector surface is polished. During manufacture, it is thus possible to form the reflecting plane surface markedly more precisely, or truer in shape, than the convex lens surface.

The design of the mirror lens also guarantees a good quality of the scanning beam, in particular a good collimation of the beam.

Further advantages and details of the present invention are revealed by the following description of an exemplary embodiment of an optical position-measuring device, on the basis of the enclosed drawings.

BRIEF DESCRIPTION OF THE DRAWINGS

The accompanying drawings are included to provide a further understanding of the invention, are incorporated in and constitute a part of this specification, illustrate embodiments of the invention and, together with the description, serve to explain the objects, advantages, and principles of the invention.

In the drawings.

DETAILED DESCRIPTION OF EMBODIMENTS OF THE INVENTION

Figure 1:
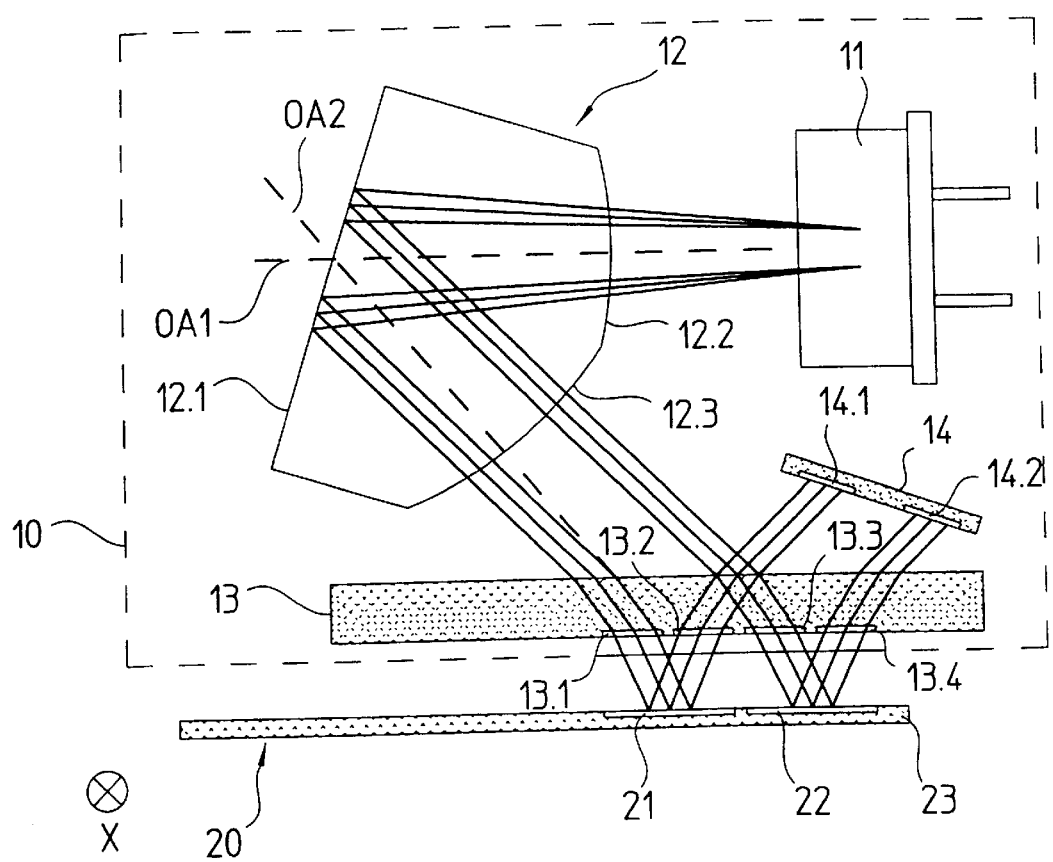
FIG. 1 is a diagram showing a schematic representation of an embodiment of the optical position-measuring device according to the present invention.

FIG. 1 shows a schematic sectional view representation of an embodiment of the optical position-measuring device according to the present invention. This device includes a scale 20 as well as a scanning unit 10 which is movable relative thereto in a measuring direction x. Measuring direction x is oriented perpendicularly to the plane of the figure. In this embodiment, the depicted position-measuring device is used for detecting linear relative movements between scanning unit 10 and scale 20, along the x axis. This position-measuring device can be used, for example, in a numerically controlled machine tool for detecting the relative position of the tool and the workpiece in a highly precise manner. The position-measuring device according to the present invention can alternatively be used as a rotary measuring device.

On the side of scale 20, an incremental graduation track of known design is arranged on a carrier body 23, and forms a measuring graduation 21. For example, carrier body 23 can be a steel measuring tape. In the exemplary embodiment shown, in addition to measuring graduation 21 for generating the displacement-dependent incremental signals, a reference marking 22 is also mounted on carrier body 23 of scale 20. In the measuring operation, an absolute reference is established in known manner during position measuring, using reference marking 22 or by generating a corresponding reference pulse signal.

Both measuring graduation 21 and reference marking 22 are composed of a succession of partial areas alternating in measuring direction x, which have different optical properties. For example, highly reflecting and non-reflecting partial areas can be formed on the measuring graduation and the reference.

Reference marking 22 is formed in a known manner, and includes a periodically distributed partial areas having different reflection properties. A plurality of similar additional reference markings 22 can be provided along the respective measuring distance, at defined positions neighboring measuring graduation 21. For example, these can be distance-coded reference marks.

Scanning unit 10 of the depicted position-measuring device includes a light source 11, a mirror lens 12 having a deflecting and a collimating effect, a scanning plate 13, as well as a detection unit 14. In scanning plate 13, there are two window regions 13.1, 13.3 having scanning graduations, whereas two further window regions 13.2, 13.4 have a transparent design, i.e., without graduation patterns. A first pair of window regions 13.1, 13.2, together with further components of the optical position-measuring device, is used for generating the displacement-dependent incremental signals. The second pair of window regions 13.3, 13.4 is used for generating one or a plurality of reference pulse signals. On the side of detection unit 14, provision is made for a first detector arrangement 14.1 having a plurality of opto-electronic detector elements for detecting the incremental signals. A second detector arrangement 14.2 for detecting the reference pulse signals is located near the first detector 14.1.

In the following text, the scanning beam path for generating the incremental signals inside the depicted position-measuring device will be explained. The beams of light emitted by light source 11, for example a high-radiance infrared LED having a small emitting surface, are deflected and aligned in a parallel or collimated manner by mirror lens 12, and pass through the scanning graduation in window region 13.1 of scanning plate 13.

Subsequently, the beams of light reach measuring graduation 21 on the side of scale 20. The measuring graduation can be a reflection measuring graduation. The beams of light are reflected by measuring graduation 21 in the direction of transparent window region 13.2 of scanning plate 13. Subsequent to passing through transparent window region 13.2, the beams impinge on detector arrangement 14.1 in detection unit 14. Detector arrangement 14.1 is used for detecting a resulting stripe pattern and for generating the displacement-dependent incremental signals. For a description of additional details for generating the displacement-dependent incremental signals, reference is made to German Patent Application 199 41 318 of the applicant, which is herein incorporated by reference in its entirety.

Figure 2:
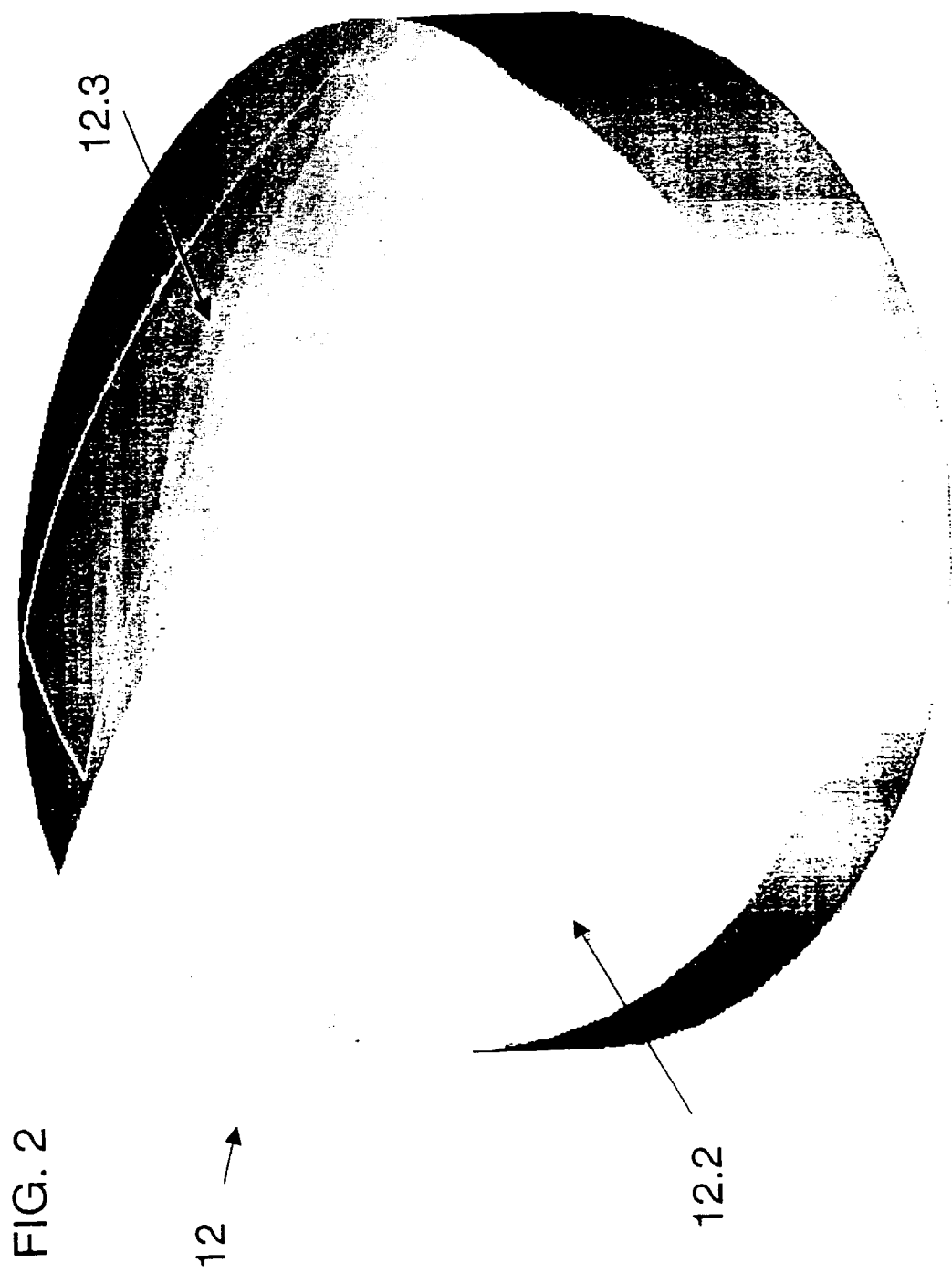
FIG. 2 is a perspective view showing the mirror lens used in the scanning unit according to the embodiment of the optical position-measuring device depicted in FIG. 1.
Figure 3A:
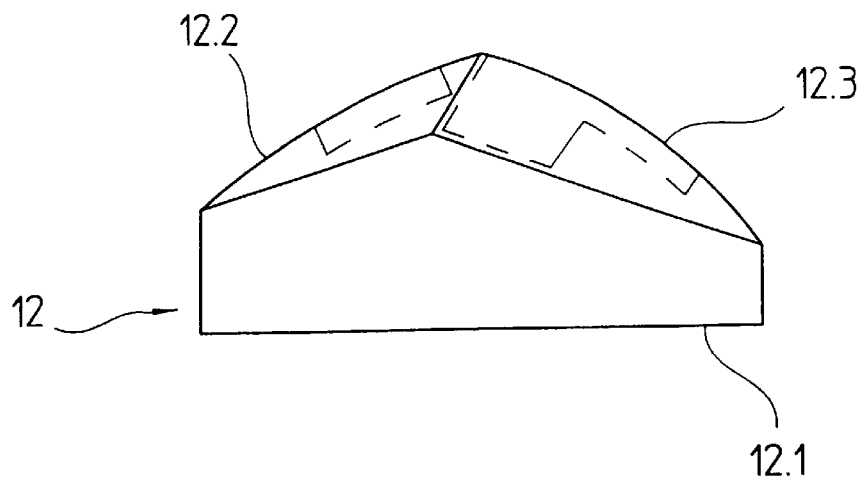
FIG. 3a is a side view of the mirror lens shown in FIG. 2.
Figure 3B:
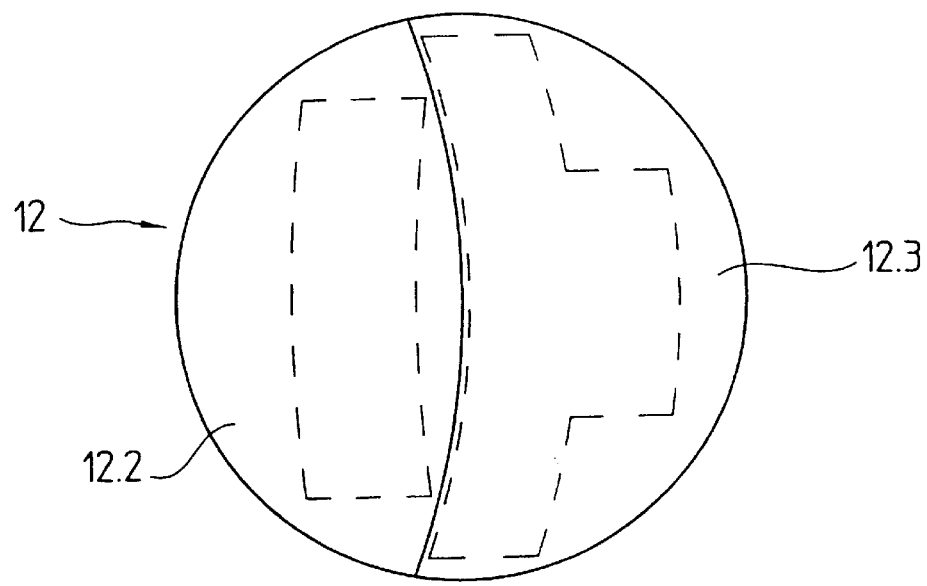
FIG. 3b is a top view of the mirror lens shown in FIG. 2.

The use of mirror lens 12 enables a compact design of scanning unit 10 of the optical position-measuring device, according to the present invention, as is shown in FIG. 1. FIGS. 2, 3a, and 3b, show mirror lens 12 in a perspective view as well as in two sectional views.

Mirror lens 12 has only a single, accurately formed plane reflector surface 12.1, opposite of which two different convex curved partial surface areas 12.2, 12.3 are arranged. In turn, the partial surfaces have a defined optical effect on the beams of light passing through, respectively. The beams entering through a first partial surface area 12.2 impinge on reflector surface 12.1 and are reflected there in the direction of the second partial surface area 12.3, through which the beams exit mirror lens 12. Partial surface areas 12.2 and 12.3 have a different curvature, and are designed in such a manner that a well collimated beam of light exists subsequent to exiting second partial surface area 12.3. As shown in FIGS. 2, 3a, and 3b, the respective partial surface areas 12.2, 12.3 are represented in dashed line through which the respective beams of rays enter or exit, respectively.

In the exemplary embodiment shown in the drawings, the partial surface areas 12.2, 12.3 of mirror lense 12 are formed as aspheres. The optical axes OA1, OA2 of the two aspheres can intersect with one another in the plane of reflector surface 12.1. Light source 11 can be arranged in the focus of mirror lens 12, on optical axis OA1 of aspherical partial surface area 12.2. This arrangement corresponds to a centering of the two lens elements in partial surface areas 12.2, 12.3. In this manner, an excellent imaging quality or collimation effect is guaranteed.

In this example, F2-glass can be used as material for mirror lens 12. Plane reflector surface 12.1 can be a rear surface mirror having an aluminum coating.

In addition to the desired folding of the scanning beam path and the resulting compact scanning unit 10, mirror lens 12 offers further advantages. In particular, mirror lens 12 can be manufactured in a manner requiring relatively little effort, for example using known hot-pressing methods. Subsequently, plane reflector surface 12.1 is ground and optically polished and the two partial surface areas 12.2, 12.3 are molded in a joint operation using a composite hollow tool, according to the required radii of curvature.

Within the scope of the present invention, further alternative possible embodiments exist. Thus, it is possible to adapt the optical effect of the two partial surface areas 12.2, 12.3 to different requirements for the scanning beam path by a suitable dimensioning. For example, these partial areas can be designed as customary spheres.

In the exemplary embodiment shown, the mirror lens has a plano-convex overstructure. However, the resulting optical effect is identical to that of a biconvex lens. In this manner, a plurality of possible embodiments can be made, depending on the scanning requirements, for example, by adapting the different partial surface areas optically in a suitable manner, the intensity distribution in the cross section of the collimated beam of rays can be influenced as desired.

What is claimed is:

1. An optical position-measuring device having a scale and a scanning unit movable relative thereto, the scanning unit comprising:
    a light source configured to emit first beams of light;
    a plurality of scanning graduations configured to interact with the first beams of light and configured to reflect second beams of light from the scale to generate a strip pattern in a detection plane;

at least one opto-electronic detector element arranged in the detection plane to detect the strip pattern;

a mirror lens disposed between the light source and one of the scanning graduations;

single plane reflector surface formed on the mirror lens;

a first and a second partial surface portion of the mirror lens, the first partial surface portion having a different curvature than the second partial surface portion, said first and second partial portions being disposed opposite of the single plane reflector surface such that the first beams of light entering the mirror lens through the first partial surface portion impinge on the reflector surface and are reflected towards the second partial surface portion, wherein curvatures of the first and second partial surface portions are selected such that a collimated beam of light exits the second partial surface area, and that optical axes of the first and second partial surface portions intersect one another in a plane of the reflector surface.

2. The optical position-measuring device as recited in claim 1, wherein the reflector surface of the mirror lens is a rear surface mirror.

3. The optical position-measuring device as recited in claim 2, wherein the plane reflector includes a rear surface mirror with an aluminum coating.

4. The optical position-measuring device as recited in claim 1, wherein the first and second partial surface portions are aspheric.

5. The optical position-measuring device as recited in claim 1, wherein the light source is disposed in a focus of the mirror lens on an optical axis of the first partial surface portion.

6. The optical position-measuring device as recited in claim 1, wherein the mirror lens is manufactured of F2-glass.

7. The optical position-measuring device as recited in claim 1, wherein the mirror lens is disposed between the light source and the scanning graduation.

8. The optical position-measuring device as recited in claim 1, wherein the light source includes a high radiance infrared LED.

9. The optical position-measuring device as recited in claim 1, wherein the reflector surface is ground and optically polished.

10. The optical position-measuring device as recited in claim 1, wherein the first and second partial surface portions include spheres.

* * * * *